US008928311B2

(12) United States Patent
Sasaki

(10) Patent No.: US 8,928,311 B2
(45) Date of Patent: Jan. 6, 2015

(54) ELECTROMAGNETIC INDUCTION TYPE ABSOLUTE POSITION MEASURING ENCODER

(75) Inventor: Kouji Sasaki, Kawasaki (JP)

(73) Assignee: Mitutoyo Corporation, Kawasaki-Shi (JP)

( * ) Notice: Subject to any disclaimer, the term of this patent is extended or adjusted under 35 U.S.C. 154(b) by 221 days.

(21) Appl. No.: 13/550,040

(22) Filed: Jul. 16, 2012

(65) Prior Publication Data
US 2013/0021024 A1 Jan. 24, 2013

(30) Foreign Application Priority Data
Jul. 22, 2011 (JP) .................................. 2011-161399

(51) Int. Cl.
*G01R 7/14* (2006.01)
*G01D 5/20* (2006.01)
(52) U.S. Cl.
CPC ..................................... *G01D 5/2073* (2013.01)
USPC .................................................. 324/207.17
(58) Field of Classification Search
USPC ............... 324/207.11–207.25, 200, 234, 235, 324/256–258
See application file for complete search history.

(56) References Cited

U.S. PATENT DOCUMENTS
6,646,434 B2 * 11/2003 Miyata et al. ............ 324/207.17

FOREIGN PATENT DOCUMENTS
JP    10-318781     12/1998
JP    2003-121206    4/2003
JP    2009-186200    8/2009

* cited by examiner

*Primary Examiner* — Melissa Koval
*Assistant Examiner* — Trung Nguyen
(74) *Attorney, Agent, or Firm* — Rankin, Hill & Clark LLP

(57) ABSTRACT

In an electromagnetic induction type absolute position measuring encoder having two or more tracks which includes: two or more rows of scale coils, each row including scale coils numerously arranged on a scale along a measuring direction so as to have a scale pitch different from that of another row; and transmitter coils and receiver coils provided on a movable grid relative to the scale in the measuring direction so as to face the scale coils, and which can measure an absolute position of the grid with respect to the scale on the basis of a flux change detected at the receiver coil via the scale coil when the transmitter coil is excited, coil lines are added to at least one side of the scale coils in the measuring direction at least in one of the tracks.

15 Claims, 9 Drawing Sheets

Fig. 2
PRIOR ART
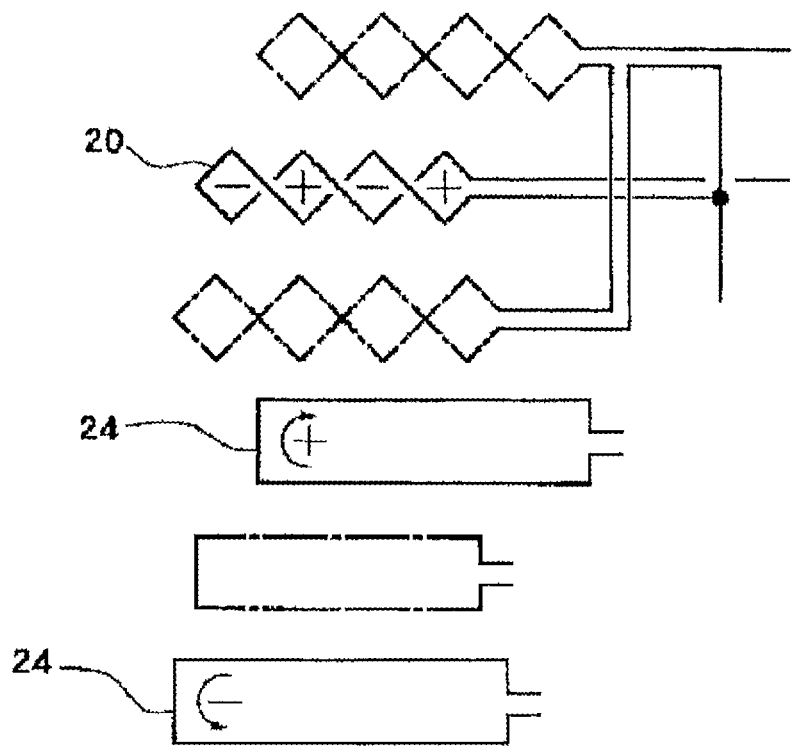
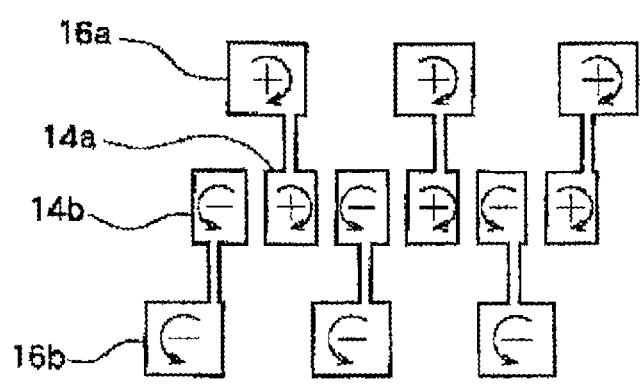

Fig. 3
PRIOR ART
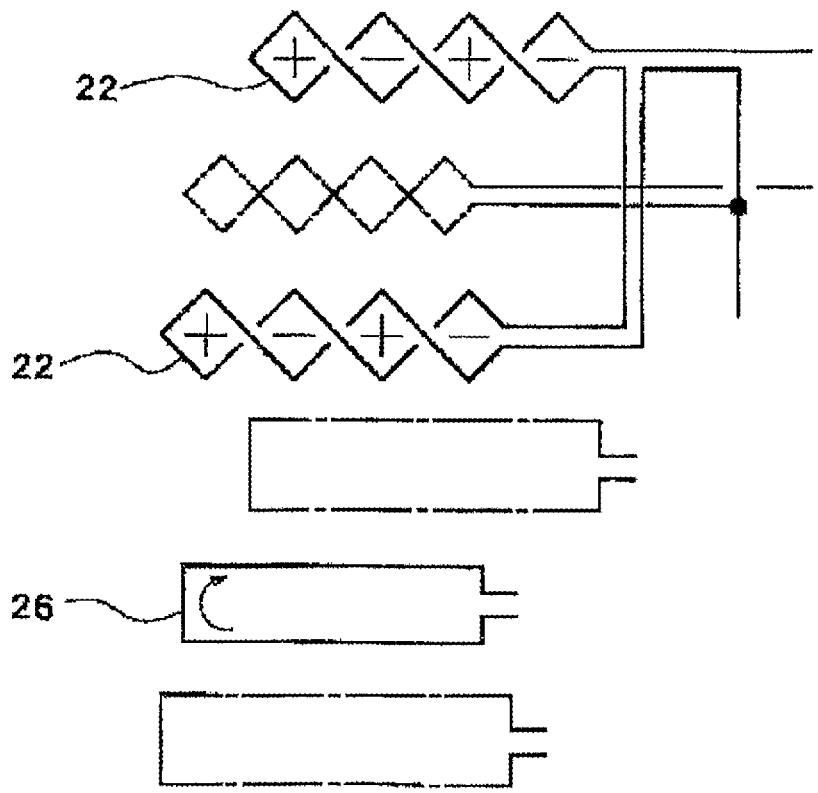
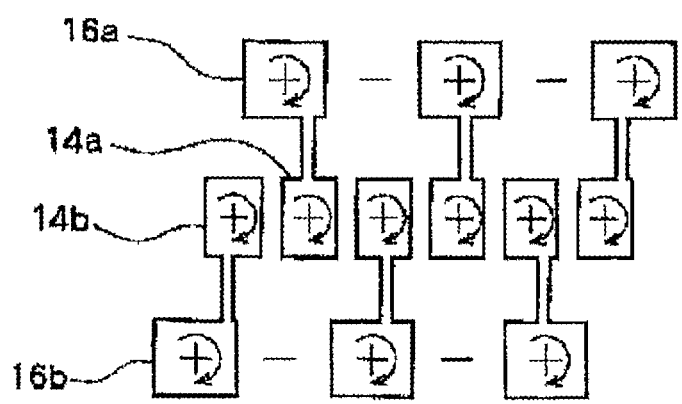

Fig. 5
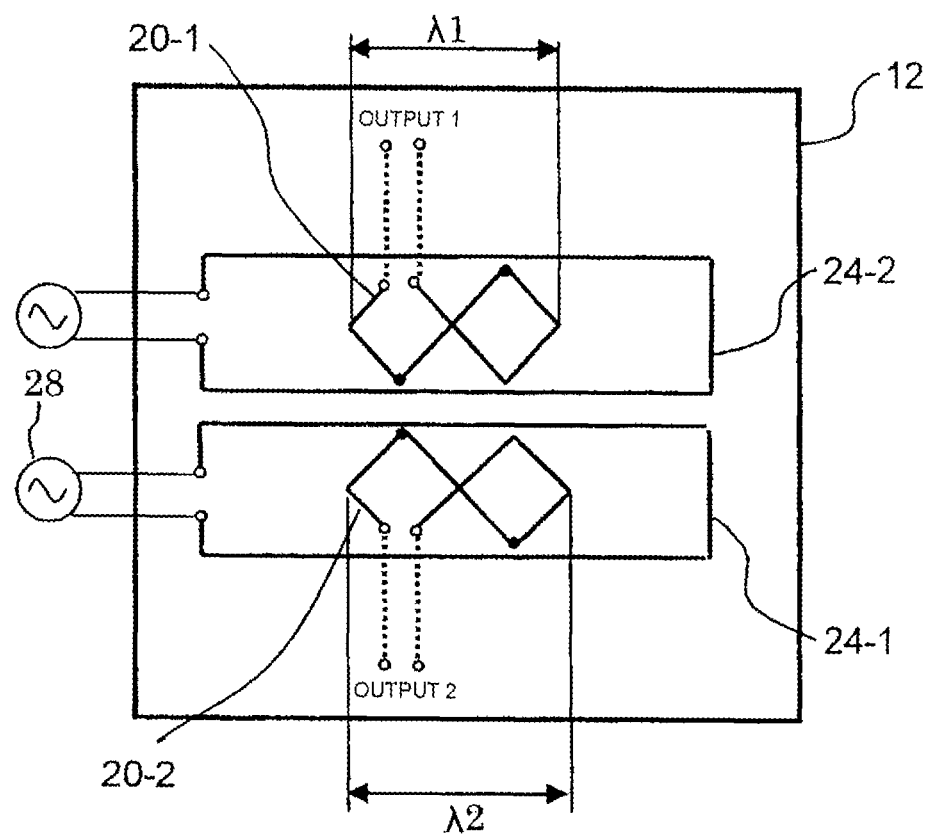
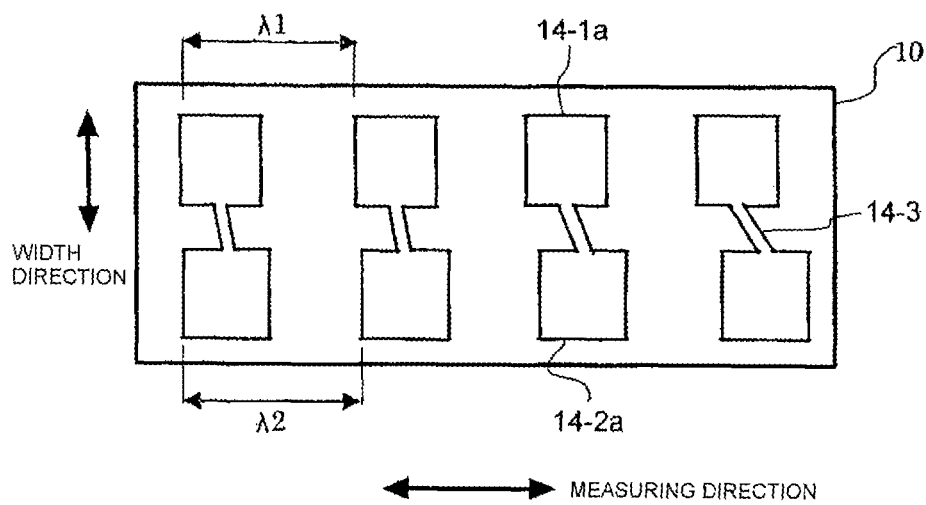

US 8,928,311 B2

ELECTROMAGNETIC INDUCTION TYPE ABSOLUTE POSITION MEASURING ENCODER

CROSS-REFERENCE TO RELATED APPLICATION

The disclosure of Japanese Patent Applications No. 2011-161399 filed on Jul. 22, 2011 including specifications, drawings and claims are incorporated herein by reference in its entirety.

BACKGROUND OF THE INVENTION

1. Field of the Invention

The present invention relates to an electromagnetic induction type absolute position measuring encoder. In particular, the present invention relates to an electromagnetic induction type absolute position measuring encoder suitable for use in a caliper, an indicator, a linear scale, a micrometer, or the like, and capable of achieving a high precision in measurement due to an improvement in S/N ratio and/or capable of reducing a size thereof due to a reduction in scale width and therefore in encoder width.

2. Description of the Related Art

As described in Japanese Patent Application Laid-Open No. Hei. 10-318781 (hereinafter referred to as Patent Literature 1) or in Japanese Patent Application Laid-Open No. 2003-121206 (hereinafter referred to as Patent Literature 2), there has been known an electromagnetic induction type encoder as that of FIG. 1 showing an example of Patent Literature 2. The electromagnetic induction type encoder includes: a number of scale coils 14 and 16 arranged on a scale 10 along a measuring direction; and transmitter coils 24 and 26 and receiver coils 20 and 22 provided on a grid (also referred to as a slider) 12 capable of moving relative to the scale 10 in the measuring direction. The electromagnetic induction type encoder detects a relative displacement between the scale 10 and the grid 12 on the basis of a flux change detected at the receiver coil via the scale coil when the transmitter coil is excited. In the drawing, reference numeral 28 denotes a transmission control section, and reference numeral 30 denotes a receiving control section.

As shown in FIG. 2, in order to reduce an offset, which is an excess signal, in such an electromagnetic induction type encoder, an offset has been reduced by placing the receiver coil 20 at a position where magnetic fields generated by the transmitter coils 24 are canceled out to be net zero (a central portion between the transmitter coils on both sides thereof in the example of FIG. 2). Note that in Patent Literature 2, the second receiver coils 22 are also provided on both sides of the second transmitter coil 26 as shown in FIG. 3 in addition to a configuration formed by the first transmitter coils 24 and the first receiver coil 20 in FIG. 2.

However, this configuration requires three rows of scale coils, and the line of the scale coils is therefore long. Thus, there is a problem that the generated induced current is attenuated due to an impedance of the scale coil itself and it is therefore difficult to obtain a strong signal.

In order to solve such a problem, the present applicant has suggested in Japanese Patent Application Laid-Open No. 2009-186200 (hereinafter referred to as Patent Literature 3) that, as shown in FIG. 4 of the present application corresponding to FIG. 6 in Patent Literature 3, plural sets of transmitter coils 24A and 24B, receiver coils 20A and 20B, and scale coils 14A and 14B are arranged symmetrically with respect to the center of the scale 10, and one (14A, for example) of the scale coils symmetrically positioned with respect to the scale center is placed at a position displaced by a ½ phase of a scale pitch λ from the other scale coil (14B, for example).

Furthermore, as shown in FIG. 5, it is conceivable to place two sets of tracks including scale coils, transmitter coils, and receiver coils provided in a scale width direction (grid width direction) with different scale pitches of λ1 and λ2 so as to measure absolute positions. The two sets are a set of scale pitch λ1 formed by a transmitter coil 24-1 on the lower side of the figure, scale coils 14-1a and a receiver coil 20-1 on the upper side of the figure and a set of scale pitch λ2 formed by a transmitter coil 24-2 on the upper side of the figure, scale coils 14-2a and a receiver coil 20-2 on the lower side of the figure. In this drawing, reference numeral 14-3 denotes a coil for connecting between the scale coils 14-1a and 14-2a (referred to as a connecting coil).

FIG. 6 shows an operation of detecting the scale coil 14-1a on the upper side of FIG. 5 having the scale pitch of λ1 by the receiver coil 20-1. As shown in the drawing, a magnetic field generated by the driving of the transmitter coil 24-1 with a driving current $I_D$ leads to the generation of an induced current Ia at the scale coil 14-2a. Then, a magnetic field generated by the current Ia flowing through the scale coil 14-1a via the connecting coil 14-3 is detected at the receiver coil 20-1.

On the other hand, FIG. 7 shows an operation of detecting the scale coil 14-2a on the lower side of FIG. 5 having the scale pitch of λ2 by the receiver coil 20-2. As shown in the drawing, a magnetic field generated by the driving of the transmitter coil 24-2 with the driving current $I_D$ leads to the generation of the induced current Ia at the scale coil 14-1a. Then, a magnetic field generated by the current Ia flowing through the scale coil 14-2a via the connecting coil 14-3 is detected at the receiver coil 20-2.

With the configuration of FIG. 5, however, the receiver coil 20-1 (20-2) and the transmitter coil 24-1 (24-2) need to be placed at positions spaced apart from each other in order to reduce a direct crosstalk amount from the transmitter coils 24-1 and 24-2 to the receiver coils 20-2 and 20-1 on the grid 12. Thus, a length of the scale coils on the scale 10 (a length of the scale coil 14-1a+a length of the scale coil 14-2a+a length of the connecting coil 14-3) becomes long, resulting in an attenuation of the generated induced current Ia due to the impedance of the scale coil itself. Thus, there is a problem that a strong signal is difficult to be obtained.

SUMMARY OF THE INVENTION

The present invention has been made in order to solve the above-described problems in the conventional technique, and an object thereof is to improve a detection signal intensity at a receiver coil by increasing an induced current at a scale coil when a transmitter coil is excited and thus achieve a high precision in measurement due to an improvement in S/N ratio and/or to downsize an encoder by reducing a scale width and therefore an encoder width.

The present invention provides an electromagnetic induction type absolute position measuring encoder having two or more tracks which includes: two or more rows of scale coils, each row including scale coils numerously arranged on a scale in a measuring direction so as to have a scale pitch different from that of another row; and a transmitter coil and a receiver coil provided on a movable grid relative to the scale in the measuring direction so as to face the scale coils, so that the encoder can measure an absolute position of the grid with respect to the scale on the basis of a flux change detected at the receiver coil via the scale coil when the transmitter coil is excited. In the electromagnetic induction type absolute position measuring encoder, a coil line is added to at least one side of the scale coil in the measuring direction at least in one of the tracks. The present invention solves the above-described problems by providing this configuration.

Herein, the coil lines may be added to both sides of the scale coil in the measuring direction.

Moreover, areas of the added coils added to both the sides of the scale coil in the measuring direction may be set equal to each other.

Alternatively, areas of the added coils added to both the sides of the scale coil in the measuring direction may be set different from each other.

Moreover, a line thickness of the added coil may be set to the same thickness as a scale coil main body.

Moreover, three rows of the scale coils may be provided.

Moreover, the added coils may be added only to the scale coils arranged on an upper side and a lower side, respectively, and the added coil may not be added to the scale coil arranged at a center.

Moreover, the scale coil may have a shape of rectangular frame.

According to the present invention, as compared to the configuration of FIG. 5, it is possible to increase a received signal intensity via the scale coil with the crosstalk amount between the transmitter coil and the receiver coil being the same. Therefore, it is possible to (1) improve a measurement accuracy by an improvement in S/N ratio, (2) increase a gap between the grid and the scale, (3) downsize an encoder by decreasing a width of the scale coil to obtain a reduced scale width and thus a reduced encoder width, and the like.

BRIEF DESCRIPTION OF THE DRAWINGS

The preferred embodiments will be described with reference to the drawings, wherein like elements have been denoted throughout the figures with like reference numerals, and wherein:

FIG. 2 is a plan view likewise showing an arrangement of coils on a grid and a first action;

FIG. 3 is a plan view likewise showing an arrangement of coils on the grid and a second action;

FIG. 5 is a plan view of a grid and a scale showing a basic configuration of an electromagnetic induction type absolute position measuring encoder under consideration by the present inventor;

DETAILED DESCRIPTION OF THE PREFERRED EMBODIMENTS

Embodiments of the present invention will be described below in detail with reference to the drawings.

Figure 1:
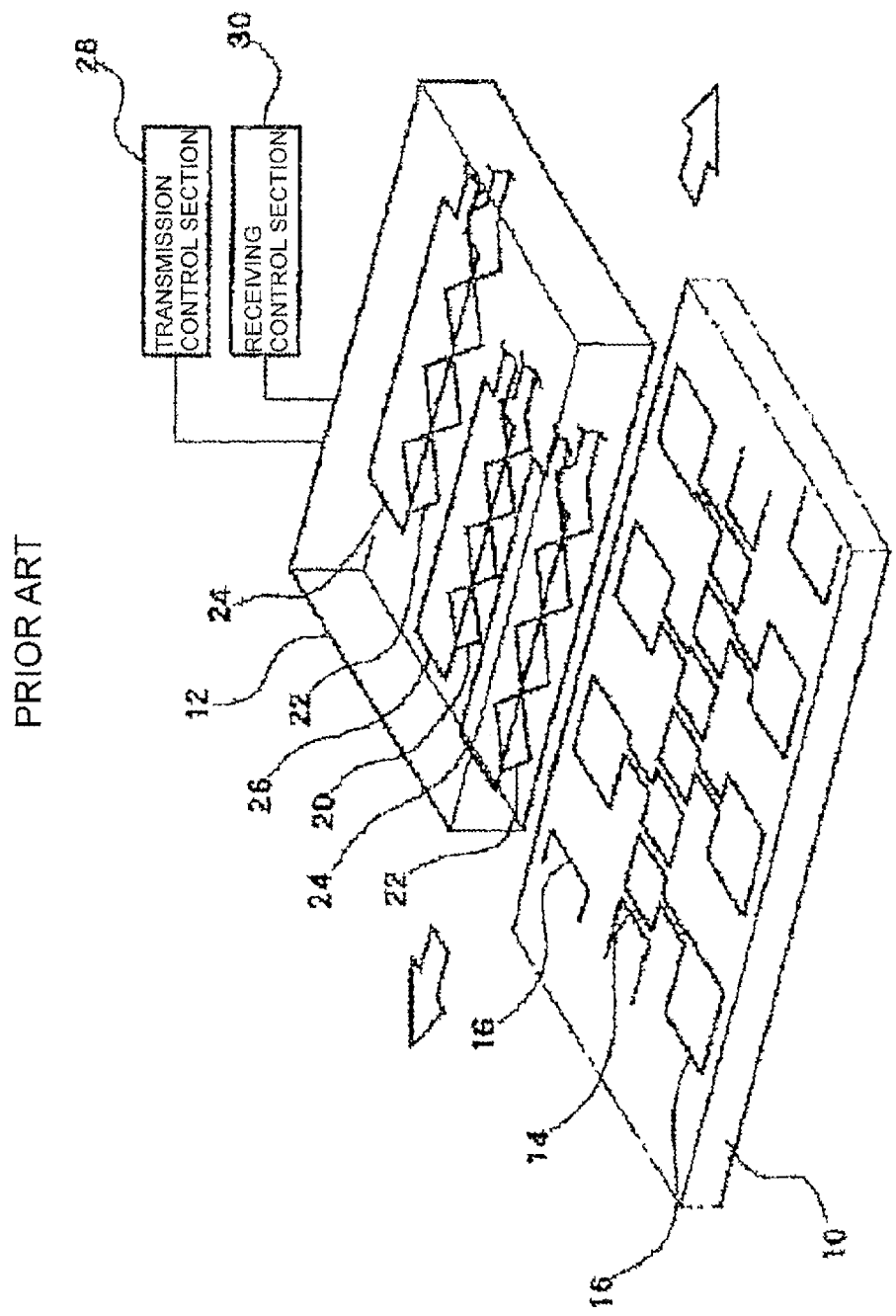
FIG. 1 is a perspective view showing an entire configuration of a conventional electromagnetic induction type encoder described in Patent Literature 2.
Figure 4:
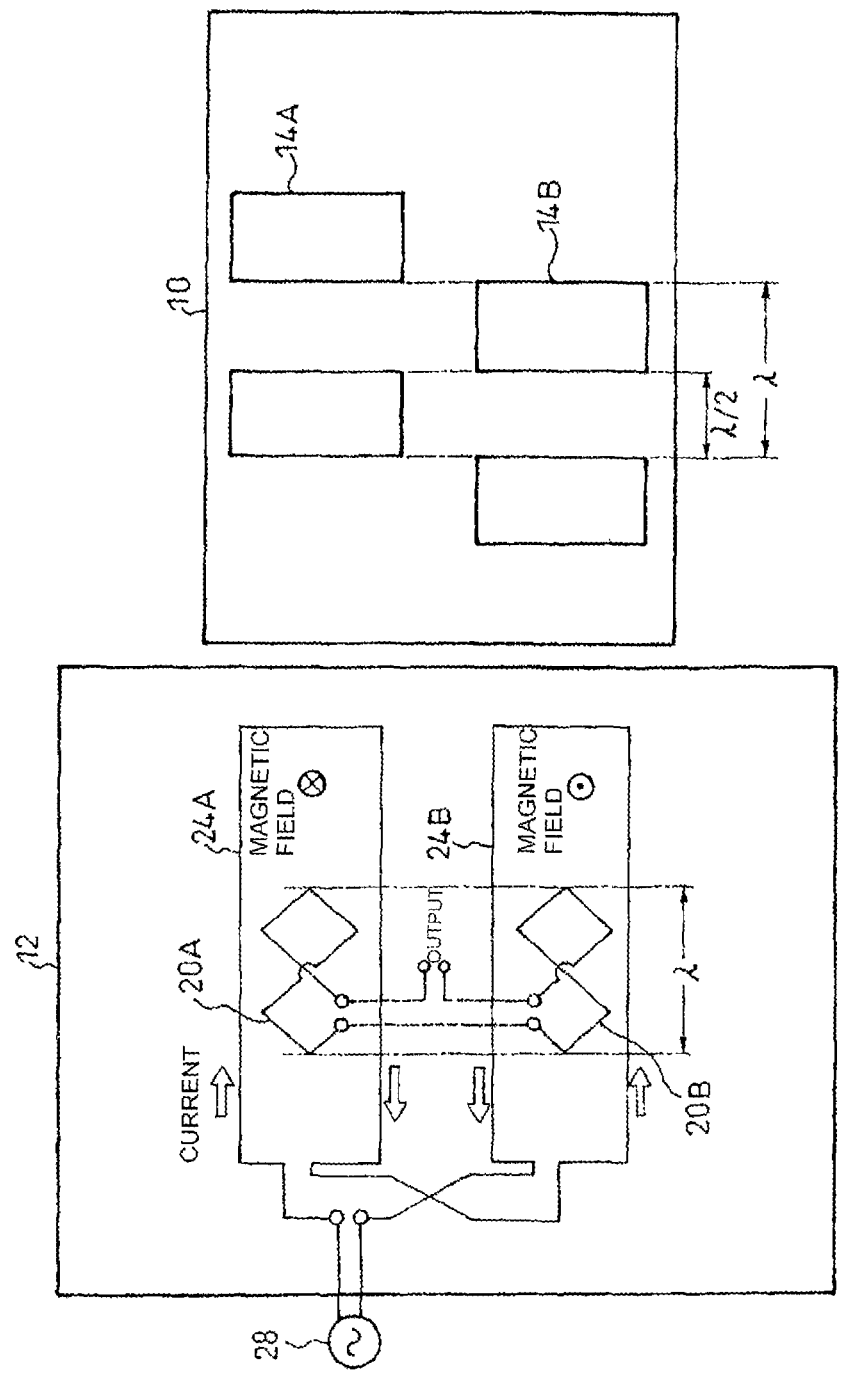
FIG. 4 is a plan view showing a grid and a scale of a conventional electromagnetic induction type encoder described in Patent Literature 3.
Figure 6:
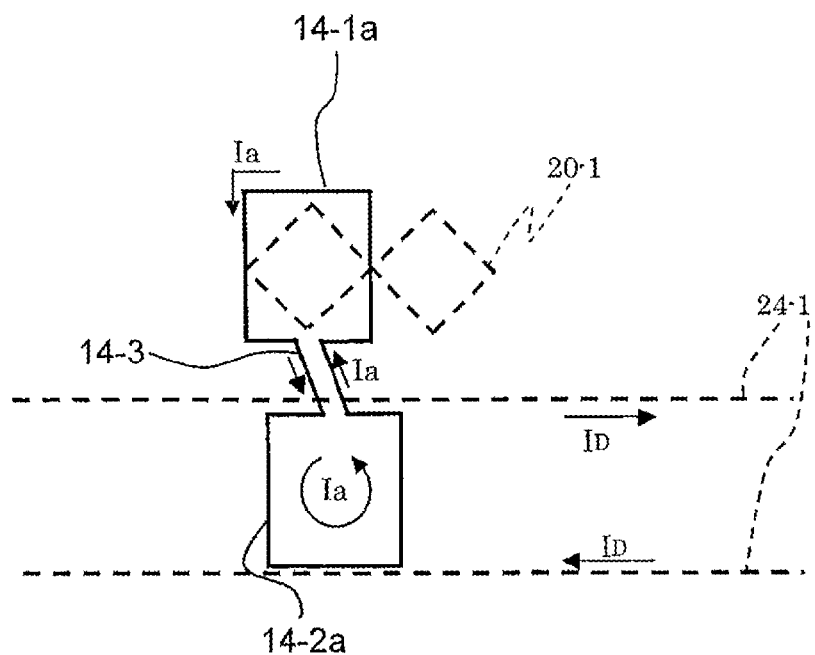
FIG. 6 is a plan view of a main section illustrating how a transmitter coil on a lower side of FIG. 5 is driven and detection is made at a receiver coil on an upper side thereof.
Figure 7:
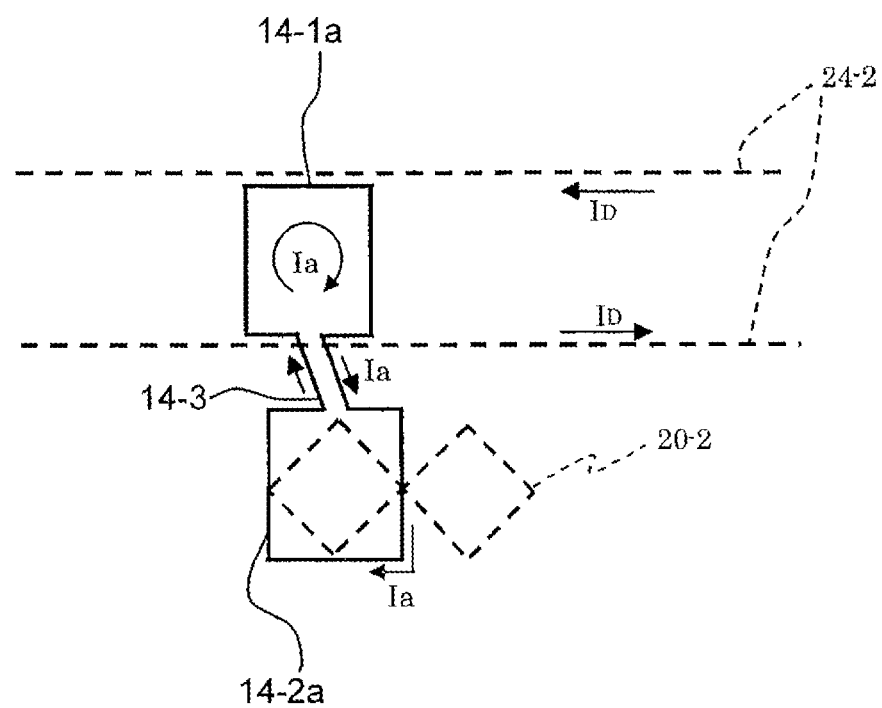
FIG. 7 is a plan view of a main section illustrating how a transmitter coil on the upper side of FIG. 5 is driven and detection is made at a receiver coil on the lower side thereof.
Figure 8:
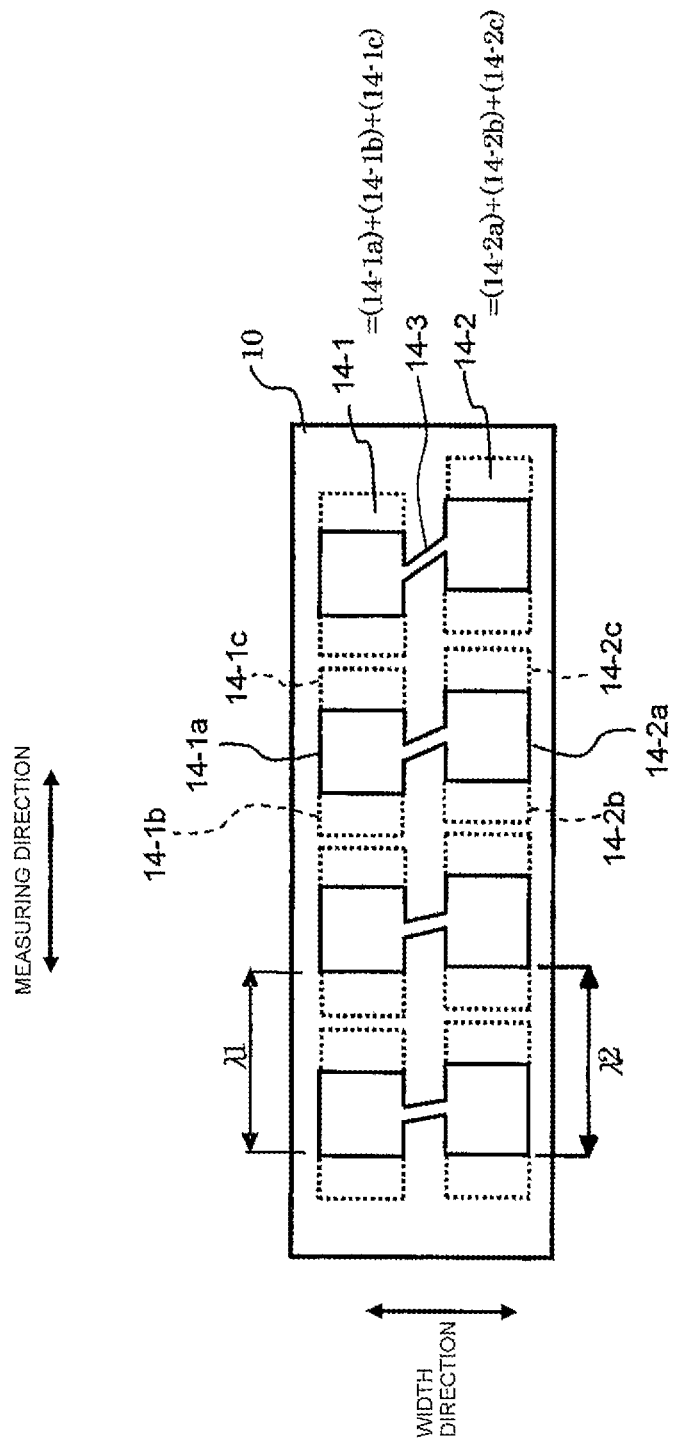
FIG. 8 is a plan view of a scale according to a first embodiment of the present invention.

As shown in FIG. 8, according to the first embodiment of the present invention, a scale coil 14-1 is obtained by adding coil lines (also referred to as added coils) 14-1b and 14-1c shown by broken lines in the drawing to both sides of a scale coil 14-1a main body (also referred to as a main body coil) similar to that in FIG. 5 in a measuring direction, and a scale coil 14-2 is similarly obtained by adding coil lines (also referred to as added coils) 14-2b and 14-2c shown by broken lines in the drawing to both sides of a scale coil 14-2a main body (also referred to as a main body coil) similar to that in FIG. 5 in the measuring direction.

How the above-described configuration leads to an increase in induced current generated at a scale coil will be described below in detail.

Figure 9:
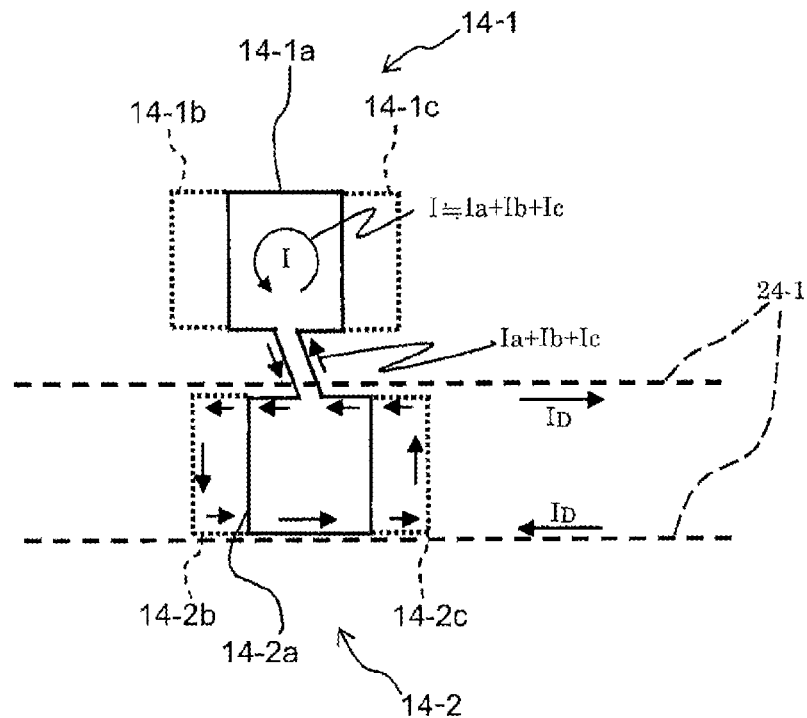
FIG. 9 is a plan view of a main section illustrating how a transmitter coil on a lower side of FIG. 8 is driven and detection is made at a receiver coil on an upper side thereof.

First, in a case where the scale coil 14-1 on the upper side of FIG. 8 having a scale pitch of $\lambda 1$ is detected by a receiver coil 20-1, a magnetic field generated by the driving of a transmitter coil 24-1 with a driving current $I_D$ leads to the generation of a current obtained by adding an induced current Ib+Ic resulting from the addition of the coils 14-2b and 14-2c to the induced current Ia from the conventional scale coil main body 14-2a as shown in FIG. 9. Thus, the current flowing through the scale coil 14-1 via a connecting coil 14-3 is I=Ia+Ib+Ic. Since the current I flows through the shortest portion of the scale coil 14-1, nearly all the current I flows through the scale coil main body 14-1a. There is no change in magnetic field distribution or the like due to the presence of the added coils 14-1b and 14-1c added to the scale coil 14-1, and only the signal intensity thereof is improved. Thus, there is no disadvantage. Accordingly, as compared to the scale configuration of FIG. 5, the signal intensity detected at the receiver coil 20-1 is increased by a factor of (Ia+Ib+Ic)/Ia.

Figure 10:
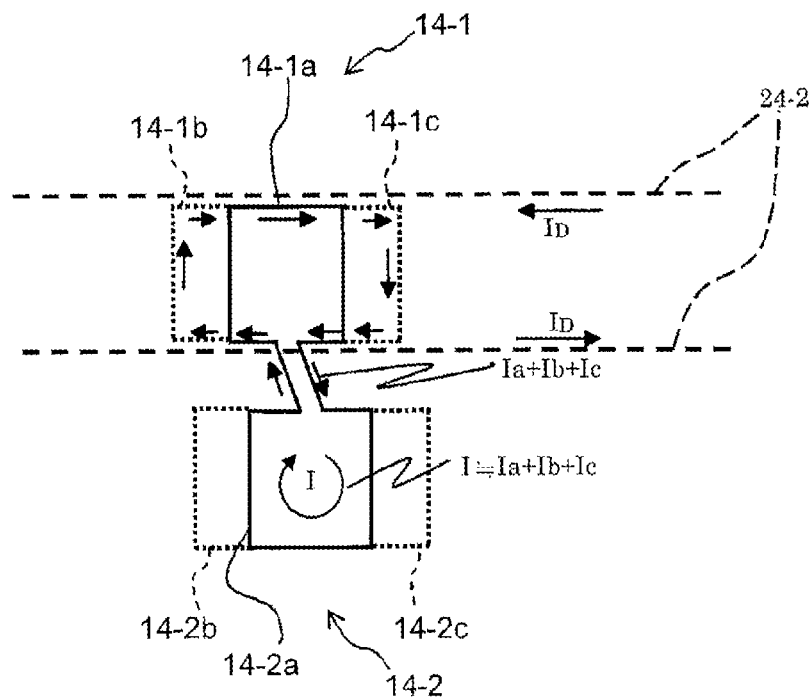
FIG. 10 is a plan view of a main section illustrating how a transmitter coil on the upper side of FIG. 8 is driven and detection is made at a receiver coil on the lower side thereof.

On the other hand, in a case where the scale coil 14-2 on the lower side of FIG. 8 having a scale pitch of $\lambda 2$ is detected by a receiver coil 20-2, a magnetic field generated by the driving of a transmitter coil 24-2 with the driving current $I_D$ leads to the generation of a current obtained by adding the induced current Ib+Ic resulting from the addition of the coils 14-1b and 14-1c to the induced current Ia from the conventional scale coil main body 14-1a in a similar manner to the above-described explanation as shown in FIG. 10. Thus, the current flowing through the scale coil 14-2 via the connecting coil 14-3 is I=Ia+Ib+Ic. Since the current I flows through the shortest portion of the scale coil 14-2, nearly all the current I flows through the scale coil main body 14-2a. There is no change in magnetic field distribution or the like due to the presence of the added coils 14-2b and 14-2c added to the scale coil 14-2, and only the signal intensity thereof is improved. Thus, there is no disadvantage. Accordingly, as compared to the scale configuration of FIG. 5, the signal intensity detected at the receiver coil 20-2 is increased by a factor of (Ia+Ib+Ic)/Ia.

It is preferable that the added coils 14-1b, 14-1c, 14-2b, and 14-2c have the same line thickness as the scale coil main bodies 14-1a and 14-2a in view of the signal intensity. However, they may have a different line thickness.

Moreover, the areas of the added coils 14-1b and 14-1c and those of the added coils 14-2b and 14-2c may be respectively identical to each other on both sides in the measuring direction. In such a case, an influence of the added coil 14-1*b* (14-2*b*) on the scale coil main body 14-1*a* (14-2*a*) can be made equal to that of the added coil 14-1*c* (14-2*c*) on the scale coil main body 14-1*a* (14-2*a*). Note that it is also possible to change the areas of the added coils between an upstream side and a downstream side in the measuring direction. For example, as in the second embodiment shown in FIG. 11, the coil lines 14-1*b* and 14-2*b* can be added only on one side in the measuring direction (the left side in FIG. 11).

Figure 11:
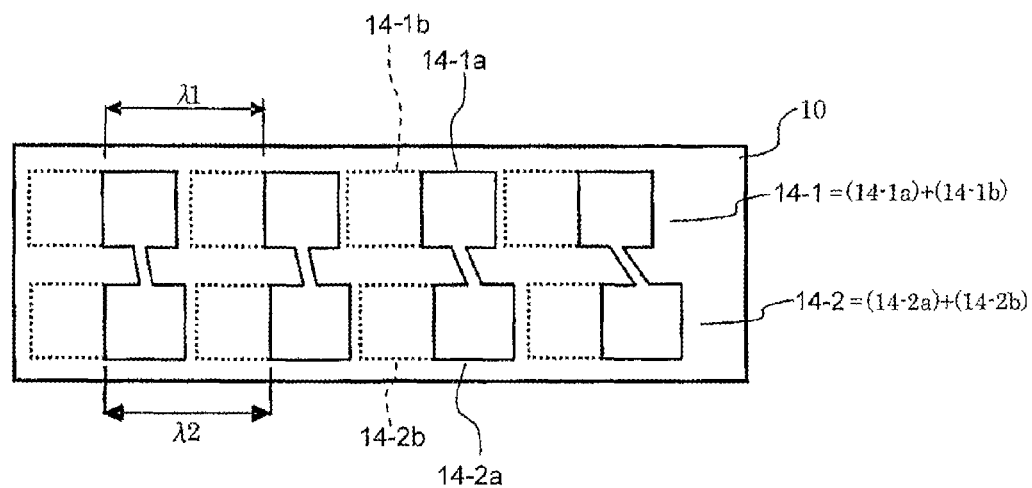
FIG. 11 is a plan view of a scale according to a second embodiment of the present invention.
Figure 12:
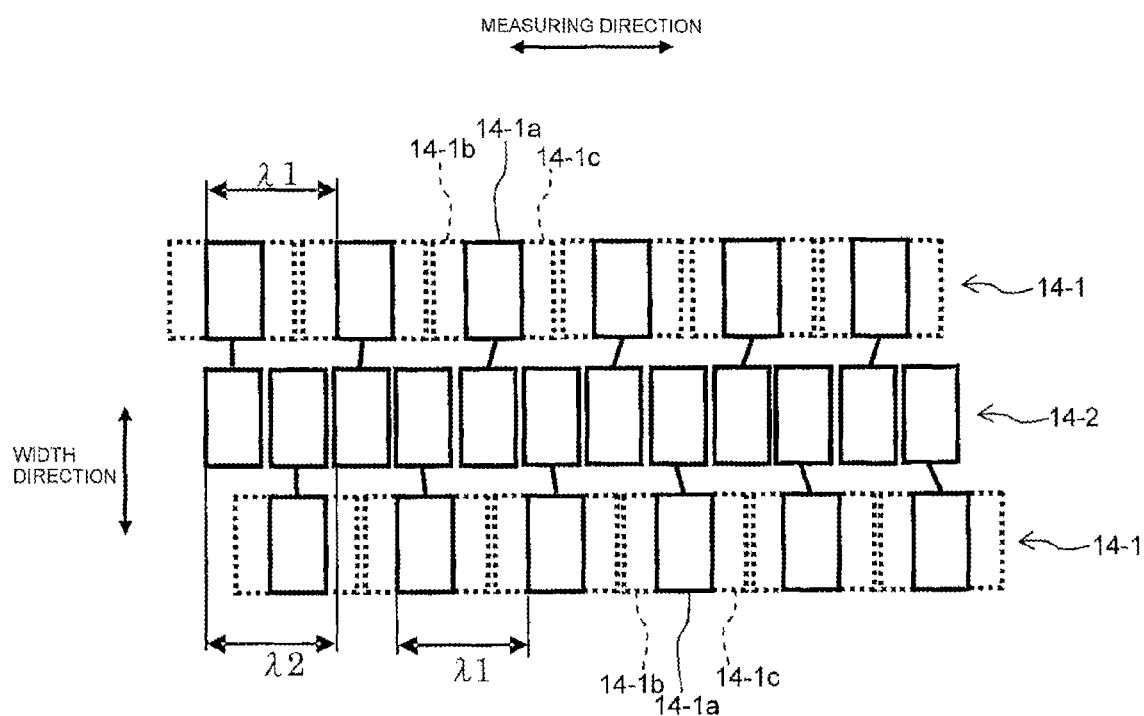
FIG. 12 is a plan view of a scale according to a third embodiment of the present invention.

Furthermore, the application of the present invention is not limited to that including two rows of tracks as shown in FIG. 8 or FIG. 11. As in the third embodiment shown in FIG. 12, the present invention can also be applied to that including three rows of tracks in which the scale coils 14-1 having a scale pitch of λ1 are arranged on the upper side and the lower side of the scale coils 14-2 having a scale pitch of λ2, for example. In the third embodiment, the added coils 14-1*b* and 14-1*c* are added only to the scale coils 14-1 respectively arranged on the upper side and the lower side, and no coils are added to the scale coil 14-2 arranged at the center. In this way, it is also possible to omit a part of added coils.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. An electromagnetic induction type absolute position measuring encoder having two or more tracks, the encoder comprising:
   two or more rows of scale coils, each row including scale coils numerously arranged on a scale in a measuring direction so as to have a scale pitch different from that of another row; and
   a transmitter coil and a receiver coil provided on a movable grid relative to the scale in the measuring direction so as to face the scale coils, so that the encoder can measure an absolute position of the grid with respect to the scale on the basis of a flux change detected at the receiver coil via the scale coil when the transmitter coil is excited, wherein
   a coil line to be an added coil is connected to at least one side of the scale coil in the measuring direction at least in one of the tracks;
   three rows of the scale coils are provided; and
   the added coils are connected only to the scale coils arranged on an upper side and a lower side, respectively, and the added coil is not connected to the scale coil arranged at a center.

2. The electromagnetic induction type absolute position measuring encoder according to claim 1, wherein the coil lines are connected to both sides of the scale coil in the measuring direction.

3. The electromagnetic induction type absolute position measuring encoder according to claim 2, wherein areas of the added coils connected to both the sides of the scale coil in the measuring direction are set equal to each other.

4. The electromagnetic induction type absolute position measuring encoder according to claim 2, wherein areas of the added coils connected to both the sides of the scale coil in the measuring direction are set different from each other.

5. The electromagnetic induction type absolute position measuring encoder according to claim 1, wherein a line thickness of the added coil is set to the same thickness as a scale coil main body.

6. The electromagnetic induction type absolute position measuring encoder according to claim 1, wherein the scale coil has a shape of rectangular frame.

7. An electromagnetic induction type absolute position measuring encoder having two or more tracks, the encoder comprising:
   two or more rows of scale coils, each row including scale coils arranged on a scale in a measuring direction so as to have a scale pitch different from that of another row; and
   a transmitter coil and a receiver coil provided on a movable grid relative to the scale in the measuring direction so as to face the scale coils, so that the encoder can measure an absolute position of the grid with respect to the scale on the basis of a flux change detected at the receiver coil via the scale coil when the transmitter coil is excited, wherein
   a coil line to be an added coil is connected to at least one side of the scale coil in the measuring direction at least in one of the tracks.

8. The electromagnetic induction type absolute position measuring encoder according to claim 7, wherein one coil line is connected to one side of the scale coil in the measuring direction and another coil line is connected to the other side of the scale coil in the measuring direction.

9. The electromagnetic induction type absolute position measuring encoder according to claim 8, wherein areas of the coil lines connected to both the sides of the scale coil in the measuring direction are set equal to each other.

10. The electromagnetic induction type absolute position measuring encoder according to claim 8, wherein areas of the coil lines added to both the sides of the scale coil in the measuring direction are set different from each other.

11. The electromagnetic induction type absolute position measuring encoder according to claim 8, wherein the coil line is connected to both sides of the scale coil in the measuring direction so that when the transmitter coil is excited, a total current flowing through the scale coil is Ia+Ib+Ic where an induced current at the scale coil is Ia, an induced current at one coil line is Ib, and an induced current at the other coil line is Ic.

12. The electromagnetic induction type absolute position measuring encoder according to claim 7, wherein a line thickness of the coil line is set to the same thickness as the scale coil.

13. The electromagnetic induction type absolute position measuring encoder according to claim 7, wherein three rows of the scale coils are provided.

14. The electromagnetic induction type absolute position measuring encoder according to claim 7, wherein the scale coil has a shape of rectangular frame.

15. The electromagnetic induction type absolute position measuring encoder according to claim 7, wherein the coil line is connected to one side of the scale coil in the measuring direction so that when the transmitter coil is excited, a total current flowing through the scale coil is Ia+Ib where an induced current at the scale coil is Ia and an induced current at the coil line is Ib.

* * * * *